(No Model.) 2 Sheets—Sheet 1.

G. C. SWEETT.
ADJUSTABLE JOINT.

No. 384,297. Patented June 12, 1888.

Witnesses.
Henry H. Burnham.
Allen Tenny.

Inventor,
George C. Sweett.
By his Attorney
Frank H. Allen (No Model.) 2 Sheets—Sheet 2.
G. C. SWEETT.
ADJUSTABLE JOINT.
No. 384,297. Patented June 12, 1888.
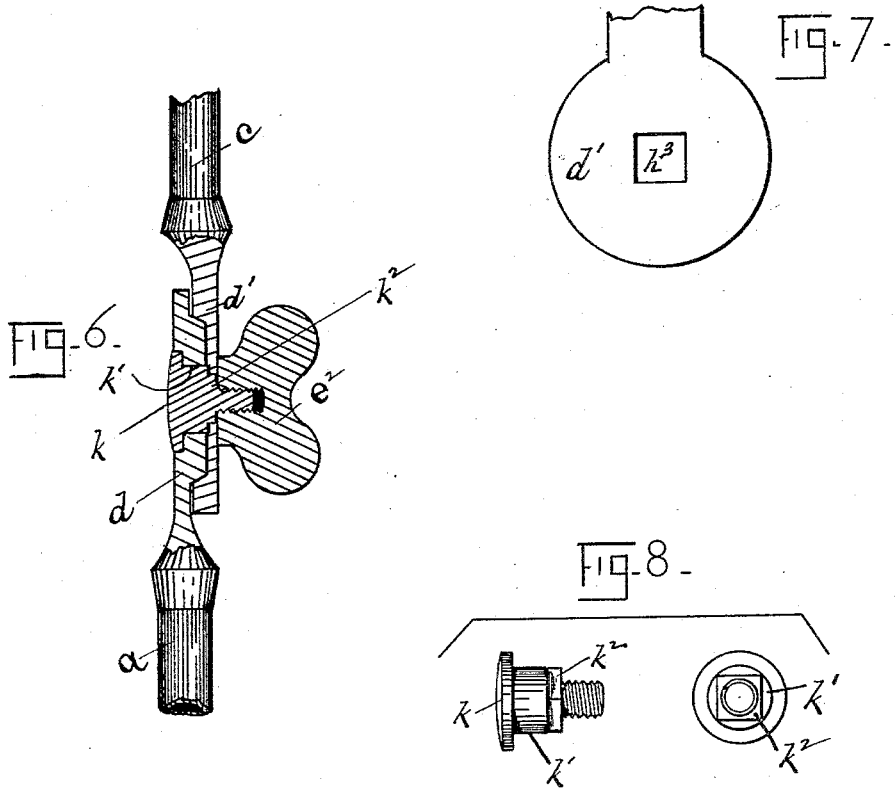
Witnesses.
Henry H. Burnham.
Allen Tenney.
Inventor,
George C. Sweett.
By his Attorney.
Frank H. Allen.

UNITED STATES PATENT OFFICE.

GEORGE C. SWEETT, OF NORWICH, CONNECTICUT, ASSIGNOR TO WILLIAM A. AIKEN, OF SAME PLACE.

ADJUSTABLE JOINT.

SPECIFICATION forming part of Letters Patent No. 384,297, dated June 12, 1888.

Application filed March 17, 1888. Serial No. 267,465. (No model.)

*To all whom it may concern:*

Be it known that I, GEORGE C. SWEETT, a citizen of the United States, residing at Norwich, in the county of New London and State of Connecticut, have invented certain new and useful Improvements in Adjustable Joints, which improvements are fully set forth and described in the following specification, reference being had to the accompanying two sheets of drawings, in which—

Figure 1:
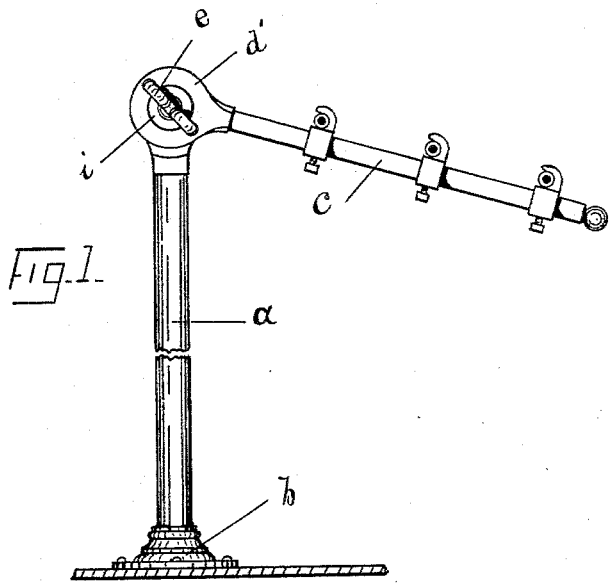
Figure 2:
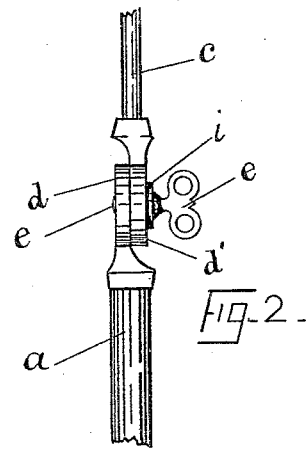
Figure 3:
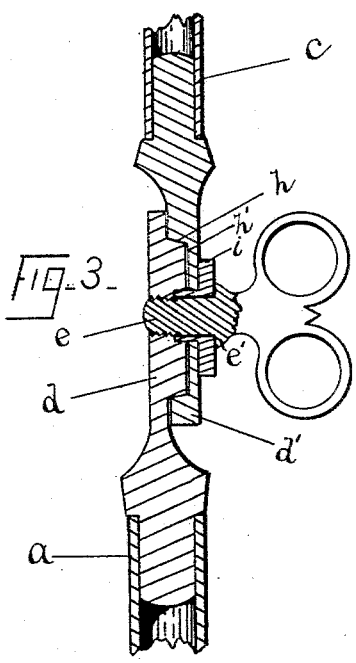
Figure 4:
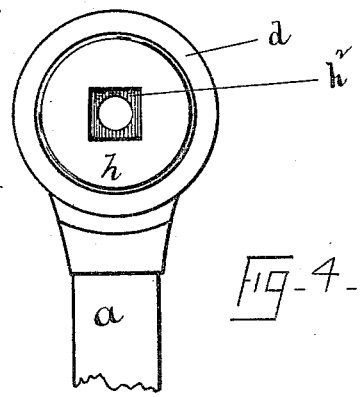
Figure 5:
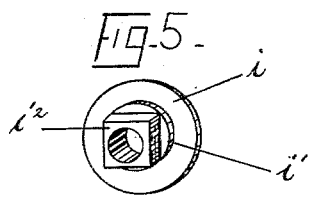

Figure 1 is an elevation of one section of a display-frame for exhibiting goods, having its lateral arm secured to the main stand by a joint of my improved form. Fig. 2 is an edge view of the said joint, showing a portion of the lateral arm raised to a perpendicular position. Fig. 3 is a longitudinal section through the center of said joint, the same being considerably enlarged; and Fig. 4 is an inner face view of the hinge-leaf $d$. In Fig. 5 I have shown, detached, the washer or bushing $i\ i'$. Fig. 6 is a longitudinal section of a joint embodying my invention, in which a clamping bolt and nut of somewhat different construction are used.
Fig. 7 is an outer face view of the disk $d'$, and Fig. 8 shows side and end views of the bolt $k$ detached.

My invention has for its immediate object the provision of a quickly-adjustable joint for display-frames, photographic head-rests, music-stands, and the like articles, and seeks to furnish at a moderate cost a joint that may be adjusted at any desired angle, and which may be securely fastened in a given position by an ordinary thumb-screw or nut. Joints of this class have been constructed heretofore in various ways, the sections or leaves of the joint proper being in some cases simply disks whose confronting faces are secured together by a bolt and depending entirely on friction to support the adjustable section. In other cases one of said joint-sections has been formed as a toothed disk, held in desired position by a pawl hung in or on the companion section.

In the first example of the prior art (that in which the movable section is held by friction only) the frictional contact of the faces of the disks is not always sufficient to sustain the load imposed on the movable section, and as a result the joint slips and the lateral arm becomes displaced. In the latter example (pawl and ratchet) the movable section has a limited adjustment, being confined to certain prescribed stages, depending on the number or frequency of the ratchet-teeth.

My present device is believed to avoid these objectionable features and results, and provides both a fine adjustment of the joint and a means for securely and quickly locking the same.

Referring to the drawings, the letter $a$ indicates one of the supporting-stands of a display-frame, supported usually in its upright position by a flanged foot, $b$, secured to a counter, floor, or similar rigid support. To the upper end of stand $a$ is hinged an arm, $c$, which arm, aside from its joint-section, may be formed as here delineated, or may be varied in construction to perform the particular office for which it is provided. The joint proper, in which my invention lies, is formed of two disks, $d\ d'$, the former being a rigid part of stand $a$ and the latter ($d'$) a rigid part of the movable arm $c$.

In the particular form of joint illustrated in Figs. 1 to 5, disk $d$ is drilled centrally and tapped to receive a thumb-screw, $e$, formed with a shoulder, $e'$. Said disk is also provided on its inner face with a concentric boss, $h$, whose perimeter is beveled, as plainly shown in Fig. 3. The confronting face of the companion disk $d'$ is constructed with a depression or recess, $h'$, which provides a seat for the boss $h$ when the parts are assembled. The diameter of said recess should be slightly less than the corresponding diameter of the boss, so that the perimeter of the latter will engage the annular wall of the recess and wedge firmly therein when the parts are clamped together, as hereinafter set forth.

The boss $h$ is formed with an angular opening, $h^2$, preferably square, as shown in Fig. 4. Disk $d'$ has a central circular opening somewhat larger than the body of thumb-screw $e$. Within said circular opening is placed a bushing formed with a flange or head, $i$, a body portion, $i'$, equal to the thickness of the adjacent disk, $d'$, and a square portion, $i^2$, which enters the square cavity in disk $d$, above described.

Assuming that the hinge parts, as described, are properly assembled and the thumb-screw $e$ screwed nearly home, it will be understood that the section $d'$ may be rocked or swiveled on the boss $h$ and round portion $i'$ of the bushing; but when the thumb-screw is turned home it serves as a clamp to bring into closer engagement the disks $d\ d'$. This action wedges boss $h$ firmly in its seat and securely interlocks said disks. The squared end $i^2$ of the bushing renders it non-rotatable—that is to say, it retains at all times the same position relative to the disk $d$—so that the thumb-screw is in contact only with the non-rotatable parts of the joint and could not be accidentally loosened by the starting or slipping of disk $d'$.

In the modified form of joint illustrated in Figs. 6, 7, and 8 the confronting faces of the disks $d\ d'$ are formed as above described. Said disks are then clamped together by a bolt, $k$, and thumb-nut, $e^2$, the construction being substantially the reverse of the clamping devices above described. Said bolt is formed with a body portion circular throughout a considerable part of its length, as at $k'$, the balance being squared, as at $k^2$. The projecting portion is reduced in diameter and threaded to receive the thumb-nut $e^2$. Disk $d$ is provided with a central circular opening to receive the body portion $k'$ of bolt $k$, and is preferably counterbored, as shown, to receive the head. The companion disk, $d'$, has a square central opening, $h^3$, to receive the squared part $k^2$ of said bolt. When the several parts are assembled and the thumb-nut turned home, the disks are drawn into close engagement to effect a powerful lock, as first above described. In the act of adjusting arm $c$ the thumb-nut moves with disk $d'$, whose face it engages.

The details of construction of my device are easily and cheaply performed by the commonest methods of drilling, milling, tapping, and turning, so that no special or expensive tools or machines are required.

Having described my invention, I claim as new and desire to secure by Letters Patent—

An adjustable joint for display-frames, photo head-rests, and the like articles, consisting of two disks having their confronting faces formed, respectively, with a boss with beveled perimeter and a recess to receive the same, in combination with devices, substantially as herein described, for clamping together said disks.

GEORGE C. SWEETT.

Witnesses:
A. C. HATCH,
E. A. TRACY.